United States Patent
Okada (10) Patent No.: US 10,680,267 B2
(45) Date of Patent: Jun. 9, 2020

(54) FLOW BATTERY INCLUDING SEPARATOR CONTAINING NONIONIC POLYMER

(71) Applicant: Panasonic Intellectual Property Management Co., Ltd., Osaka (JP)

(72) Inventor: Yuka Okada, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 254 days.

(21) Appl. No.: 15/979,392

(22) Filed: May 14, 2018

(65) Prior Publication Data

US 2018/0342750 A1 Nov. 29, 2018

(30) Foreign Application Priority Data

May 29, 2017 (JP) .................................. 2017-105783

(51) Int. Cl.
| | | |
|---|---|---|
| *H01M 8/1025* | (2016.01) | |
| *H01M 8/04186* | (2016.01) | |
| *H01M 8/18* | (2006.01) | |
| *H01M 8/1041* | (2016.01) | |
| *H01M 8/1018* | (2016.01) | |

(52) U.S. Cl.
CPC ..... *H01M 8/1025* (2013.01); *H01M 8/04186* (2013.01); *H01M 8/1041* (2013.01); *H01M 8/188* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS

| | | | |
|---|---|---|---|
| 5,393,847 A | 2/1995 | Alloin et al. | |
| 2009/0017379 A1* | 1/2009 | Inatomi | B60L 50/64 429/213 |
| 2012/0135278 A1 | 5/2012 | Yoshie et al. | |
| 2014/0178735 A1* | 6/2014 | Wang | H01M 8/20 429/105 |
| 2015/0133570 A1 | 5/2015 | Shin et al. | |
| 2015/0280259 A1* | 10/2015 | Anderson | H01M 8/188 429/409 |

FOREIGN PATENT DOCUMENTS

| | | |
|---|---|---|
| JP | 6-256673 | 9/1994 |
| JP | 2006-216261 | 8/2006 |
| JP | 2014-524124 | 9/2014 |
| JP | 2015-093989 | 5/2015 |
| WO | 2010/143634 | 12/2010 |
| WO | 2016/208123 | 12/2016 |

* cited by examiner

*Primary Examiner* — Ula C Ruddock
*Assistant Examiner* — Matthew W Van Oudenaren
(74) *Attorney, Agent, or Firm* — McDermott Will & Emery LLP (57) ABSTRACT

A flow battery includes a first liquid containing a first nonaqueous solvent; a first electrode immersed in the first liquid; a second electrode which is a counter electrode to the first electrode; and a separator separating the first electrode from the second electrode. The separator includes a solid electrolyte containing: a metal compound and a nonionic polymer which includes a poly(alkylene oxide) and crosslinking points. At least one of alkylene oxide units forming the poly(alkylene oxide) is composed of a tetramethylene oxide unit.

17 Claims, 4 Drawing Sheets

FLOW BATTERY INCLUDING SEPARATOR CONTAINING NONIONIC POLYMER

BACKGROUND

1. Technical Field

The present disclosure relates to a flow battery.

2. Description of the Related Art

Japanese Unexamined Patent Application Publication (Translation of PCT Application) No. 2014-524124 has disclosed a redox flow battery system having an energy storage device containing a redox mediator.

WO2016/208123 has disclosed a flow battery using a redox species.

SUMMARY

In one general aspect, the techniques disclosed here feature a flow battery comprising: a first liquid containing a first nonaqueous solvent; a first electrode immersed in the first liquid; a second electrode which is a counter electrode to the first electrode; and a separator separating the first electrode from the second electrode. In the flow battery described above, the separator includes: a solid electrolyte containing a metal compound and a nonionic polymer which includes a poly(alkylene oxide) and cross-linking points, and at least one of alkylene oxide units forming the poly(alkylene oxide) is composed of a tetramethylene oxide unit.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Heretofore, when a lithium ion conductive inorganic solid electrolyte is used as a separator of a nonaqueous flow battery, since the flexibility of the separator is inferior, cracks are liable to be generated when the area thereof is increased, and as a result, it has been difficult to achieve an increase in capacity. In addition, as the separator of the nonaqueous flow battery, when a polymer solid electrolyte having a flexibility is used, since the polymer solid electrolyte is swelled by or dissolved in a nonaqueous solvent contained in each of a catholyte (a cathode liquid electrolyte) and an anolyte (an anode liquid electrolyte), the above two types of liquid electrolytes are mixed together during operation, and as a result, the charge/discharge characteristics are seriously degraded.

The present disclosure provides a flow battery including an electrolyte which is not swelled by a nonaqueous solvent and which is able to conduct lithium ions and also provides a separator to be used for the above flow battery.

The present disclosure includes a flow battery described in each of the following items and a separator to be used therefor.

[Item 1]

A flow battery comprises:
a first liquid containing a first nonaqueous solvent;
a first electrode immersed in the first liquid;
a second electrode which is a counter electrode to the first electrode; and
a separator separating the first electrode from the second electrode.

The separator comprises a solid electrolyte containing:
a metal compound; and
a nonionic polymer which includes a poly(alkylene oxide) and cross-linking points.

At least one of alkylene oxide units forming the poly(alkylene oxide) is composed of a tetramethylene oxide unit.

According to the flow battery of the present disclosure, since the separator is not swelled by the nonaqueous solvent and is able to conduct lithium ions, the range of choice of an active material is increased, and as a result, a flow battery having a large charge capacity can be realized. In addition, even when a nonaqueous solvent of a catholyte is different from that of an anolyte, those two types of nonaqueous solvents are not mixed with each other, and the charge/discharge characteristics can be maintained for a long time. Furthermore, the separator has a flexibility, and the capacity can be easily increased.

[Item 2]

In the flow battery described in Item 1,
a content of the tetramethylene oxide unit in the alkylene oxide units may be 25 mole percent or more.

[Item 3]

In the flow battery described in Item 1 or 2,
50 mole percent or less of the alkylene oxide units may be composed of an ethylene oxide unit.

[Item 4]

In the flow battery described in any one of Items 1 to 3,
the metal compound may be a lithium compound.

[Item 5]

In the flow battery described in Item 4,
with respect to oxygen atoms derived from the alkylene oxide units, a content of lithium derived from the lithium compound may be 3 to 50 mole percent.

[Item 6]

In the flow battery described in Item 4 or 5,
the metal compound may be at least one selected from the group consisting of $LiBF_4$, $LiPF_6$, $Li(FSO_2)_2N$, $Li(CF_3SO_2)_2N$, $LiCF_3SO_3$, and $LiClO_4$.

[Item 7]

In the flow battery described in any one of Items 1 to 6,
the first nonaqueous solvent may include at least one selected from the group consisting of a solvent having a carbonate group and a solvent having an ether bond.

[Item 8]

In the flow battery described in Items 1 to 6,
the first nonaqueous solvent may include at least one selected from the group consisting of propylene carbonate, ethylene carbonate, dimethyl carbonate, ethyl methyl carbonate, and diethyl carbonate.

[Item 9]

In the flow battery described in Items 1 to 6, the first nonaqueous solvent may include at least one selected from the group consisting of 1,2-dimethoxyethane, 1,2-dibutoxyethane, diglyme, triglyme, tetraglyme, tetrahydrofuran, 2-methyltetrahydrofuran, 2,5-dimethyltetrahydrofuran, 1,3-dioxolane, and 4-methyl-1,3-dioxolane.

[Item 10]

In the flow battery described in any one of Items 1 to 9, the nonionic polymer may further include 50 mole percent or less of a carboxy group with respect to the alkylene oxide units.

[Item 11]

In the flow battery described in any one of Items 1 to 9, the solid electrolyte may further contain an acid residue.

[Item 12]

The flow battery described in any one of Items 1 to 11, may further comprise:

a first redox species in the first liquid;

a first active material; and a first circulation mechanism circulating the first liquid between the first electrode and the first active material, wherein:

the first nonaqueous solvent dissolves the first redox species, the first active material is insoluble in the first liquid, the first redox species is oxidized or reduced at the first electrode, and the first redox species is reduced or oxidized by the first active material.

[Item 13]

The flow battery described in any one of Items 1 to 12, may further comprise:

a second liquid containing a second nonaqueous solvent, wherein the second electrode is immersed in the second liquid.

[Item 14]

In the flow battery described in Item 13, a composition of the second nonaqueous solvent may be different from a composition of the first nonaqueous solvent.

[Item 15]

The flow battery described in Item 13 or 14, may further comprise:

a second redox species;

a second active material; and a second circulation mechanism circulating the second liquid between the second electrode and the second active material, wherein:

the second nonaqueous solvent dissolves the second redox species, the second active material is insoluble in the second liquid, the second redox species is oxidized or reduced at the second electrode, and the second redox species is reduced or oxidized by the second active material.

[Item 16]

A separator for a flow battery according to Item 16 of the present disclosure comprises:

a solid electrolyte containing:

a metal compound; and a nonionic polymer which includes a poly(alkylene oxide) and cross-linking points.

At least one of alkylene oxide units forming the poly(alkylene oxide) is composed of a tetramethylene oxide unit.

[Item 17]

The separator described in Item 16 may further comprise:

a substrate supporting the solid electrolyte.

Hereinafter, embodiments of the present disclosure will be described with reference to the drawings.

Embodiment 1

Figure 1:
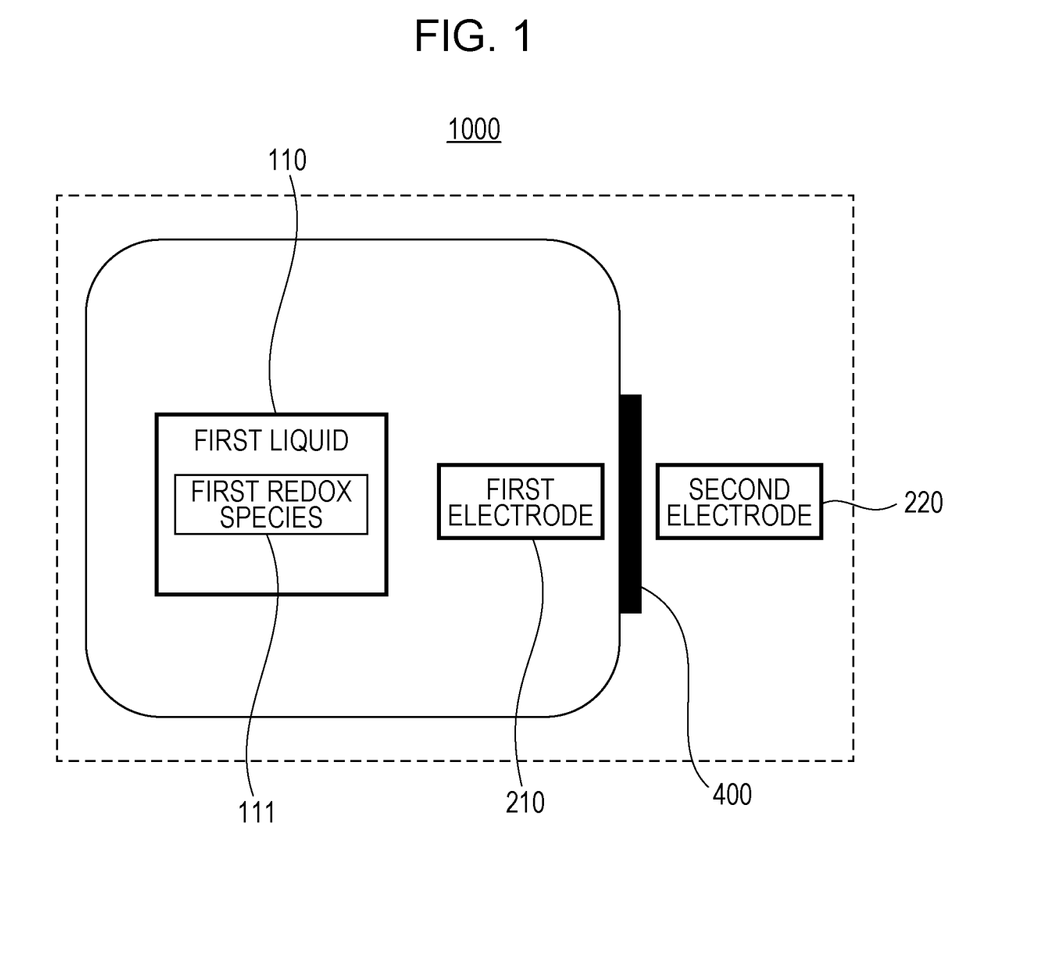
FIG. 1 is a block diagram showing a schematic structure of a flow battery according to an embodiment 1.

FIG. 1 is a block diagram showing a schematic structure of a flow battery 1000 according to an embodiment 1.

The flow battery 1000 according to the embodiment 1 includes a first liquid 110, a first electrode 210, a second electrode 220, and a separator 400.

The separator 400 includes a solid electrolyte containing a metal compound and a nonionic polymer which includes a poly(alkylene oxide) and cross-linking points. The poly(alkylene oxide) is formed of a plurality of alkylene oxide units, and at least one of the plurality of alkylene oxide units is formed of a tetramethylene oxide unit.

The first liquid 110 is a liquid electrolyte in which a first redox species 111 is dissolved in a first nonaqueous solvent.

The first electrode 210 is an electrode to be immersed in the first liquid 110.

According to the structure described above, a flow battery which has a large charge capacity and which maintains the charge/discharge characteristics for a long time can be realized.

That is, since having the structure described above, the separator 400 is not swelled by the first liquid 110 which is a liquid electrolyte in contact therewith and is able to conduct metal ions. Accordingly, the range of choice of the first liquid 110 to be used and the first redox species 111 to be contained in the first liquid 110 can be increased. Hence, a controllable range of the charging potential and the discharging potential of the flow battery 1000 is increased, and hence, the charge capacity of the flow battery 1000 can be increased.

In addition, according to the structure described above, since the separator 400 has a flexibility, the increase in area and the reduction in thickness thereof can be easily performed. Hence, a flow battery 1000 having a large capacity and a high charge/discharge rate can be realized.

In the flow battery 1000 according to the embodiment 1, the polymer forming the separator 400 includes a poly(alkylene oxide) and cross-linking points, and at least one of the alkylene oxide units forming the poly(alkylene oxide) is formed of a tetramethylene oxide unit.

As an ion conduction mechanism of a poly(alkylene oxide), there has been proposed a mechanism in which since an oxygen atom contained in the ether bond of the polymer is coordinated to a metal ion, and a polymer chain performs a segmental movement, the metal ion is moved. There has been known a phenomenon in which among poly(alkylene oxide)'s, in a poly(ethylene oxide) which has been generally known as a polymer electrolyte, when a metal compound to be contained therein is increased, since pseudo cross-linking is generated between an oxygen atom and a metal ion, and the mobility of a molecular chain is decreased, the electrical conductivity is not sufficiently increased.

On the other hand, a polymer having at least one tetramethylene oxide unit has a low crystallinity and a high flexibility. Hence, even when the metal compound concentration is increased, the pseudo cross-linking is not likely to be generated, and the mobility of a molecular chain can be sufficiently secured. Hence, by the increase of carrier ions in association with the increase in metal compound concentration, the electrical conductivity can be improved.

The polymer having at least one tetramethylene oxide unit can be synthesized by a cationic ring-opening reaction or an anionic ring-opening reaction of tetrahydrofuran or by polymerization of a monomer, such as an acrylate and/or an epoxy, derived from a polytetramethylene ether glycol.

Although not particularly limited, the rate of the tetramethylene oxide unit in the alkylene oxide units may be 25 mole percent or more. When the rate of the tetramethylene oxide unit in the alkylene oxide units is 50 mole percent or more, the features described above can be sufficiently obtained. In addition, the polymer including a poly(alkylene oxide) and cross-linking points may further includes 50 mole percent or less of a carboxy group with respect to the alkylene oxide units.

As an alkylene oxide unit other than the tetramethylene oxide unit, an ethylene oxide unit, a propylene oxide unit, a methylene oxide unit, and/or a trimethylene oxide unit may be mentioned. When the ethylene oxide unit is used as at least one of the alkylene oxide units, the coordination property to the metal ion is enhanced, and the electrical conductivity can be improved. When the rate of the ethylene oxide unit is excessively high, since the electrical conductivity is decreased by the pseudo cross-linking described above, the rate of the ethylene oxide unit in the alkylene oxide units may be 75 mole percent or less or 50 mole percent or less.

In addition, in the flow battery 1000 according to the embodiment 1, the polymer forming the separator 400 includes cross-linking points. As a method for forming the cross-linking points, for example, there may be mentioned a polymerization performed between a tetramethylene oxide unit and a monomer having at least two reactive functional groups, and energy irradiation performed on a polymer containing a poly(alkylene oxide). In the former, the cross-linking points each have the structure obtained by the polymerization between the tetramethylene oxide unit and the monomer having at least two reactive functional groups. In addition, in the latter, the cross-linking points each have the structure obtained by a covalent bond formed between carbon atoms contained in the alkylene oxide units or in units other than the alkylene oxide units.

As the reactive functional groups, for example, an acrylate group, a methacrylate group, a vinyl group, an allyl group, an epoxy group, and an oxetane group may be mentioned.

For example, when a monomer in which hydroxy groups located at two ends of a polytetramethylene ether glycol are each converted to an acrylate group or a methacrylate group is polymerized by application of energy, such as UV rays and/or heat, a polymer including tetramethylene oxide units and cross-linking points can be synthesized. In addition, as is the case described above, from a monomer in which hydroxy groups are each converted to an epoxy group and/or an oxetane group instead of using an acrylate group and/or a methacrylate group, a polymer may also be synthesized. In addition, in this case, the monomer described above may be copolymerized with a monomer having alkylene oxide units other than the tetramethylene oxide units.

As another synthetic method, a method may be mentioned in which in ring-opening polymerization of tetrahydrofuran, when a cross-linkable monomer having at least two epoxy groups or oxetane groups is copolymerized therewith, the generation of tetramethylene oxide units and the cross-linking are simultaneously performed.

In the case of the cationic ring-opening polymerization using an acidic catalyst, since strain energy of the ring of tetrahydrofuran, which is a five-membered ring, is not high, the polymerization thereof is not initiated by itself, and a ring-opening reaction of tetrahydrofuran can be performed in the presence of a cyclic compound, such as a three-membered epoxy ring and/or a four-membered oxetane ring, having higher strain energy. Hence, when a monomer having at least two epoxy groups and/or oxetane groups is allowed to be present together with tetrahydrofuran, the ring-opening reaction of tetrahydrofuran and the cross-linking of polymer chains can be simultaneously realized.

Although the molecular structure of the cross-linkable monomer is not particularly limited, when a monomer having an alkylene oxide unit is used, the electrical conductivity of the whole polymer may be configured not to be adversely influenced. As the cross-linkable monomer, for example, there may be mentioned ethylene glycol diglycidyl ether, diethylene glycol diglycidyl ether, polyethylene glycol diglycidyl ether, propylene glycol diglycidyl ether, dipropylene glycol diglycidyl ether, tripropylene glycol diglycidyl ether, polypropylene glycol diglycidyl ether, polytetramethylene glycol diglycidyl ether, trimethylolpropane triglycidyl ether, pentaerythritol triglycidyl ether, or pentaerythritol tetraglycidyl ether. In addition, a monomer having at least two epoxy groups or oxetane groups in one molecule may also be used after being modified with ethylene oxide or propylene oxide.

In addition, in the flow battery 1000 according to the embodiment 1, as the metal compound contained in the solid electrolyte, an alkaline metal compound or an alkaline earth metal compound, each of which is dissociated to generate a metal ion, may be used, and a lithium compound may be used. For example, at least one selected from the group consisting of $LiBF_4$, $LiPF_6$, $Li(CF_3SO_2)_2N$ (lithium bis(trifluoromethanesulfonyl)imide, hereinafter, referred to as "LITFSI"), $Li(FSO_2)_2N$ (lithium bis(fluorosulfonyl)imide, hereinafter, referred to as "LiFS I"), $LiCF_3SO_3$, and $LiClO_4$ may be used. The lithium derived from the lithium compound described above with respect to the oxygen atoms derived from the alkylene oxide units may be 3 to 50 mole percent or 5 to 40 mole percent. The lithium derived from the lithium compound is not limited to lithium atoms but also includes lithium ions.

As a method for manufacturing the separator 400, for example, there may be mentioned a method in which after a metal compound is dissolved in a monomer generating at least one tetramethylene oxide unit, the monomer is polymerized, and a method in which after a solution prepared by dissolving a metal compound and a polymer containing tetramethylene oxide units in an appropriate solvent is cast, the solvent is removed. Furthermore, the separator 400 may be formed by impregnating a substrate with the polymer described above. As the substrate, for example, there may be mentioned a polypropylene nonwoven fabric, a polyethylene nonwoven fabric, a poly(phenylene sulfide) nonwoven fabric, a Teflon sheet, a polyethylene separator, a polypropylene separator, a polyimide separator, a separator having a two-layer structure of a polyethylene (PE)/polypropylene (PP), or a separator having a three-layer structure of PP/PE/PP.

In the flow battery 1000 according to the embodiment 1, the first liquid 110 may use a nonaqueous solvent having at least one of a carbonate group and an ether bond.

As the nonaqueous solvent having a carbonate group, for example, at least one selected from the group consisting of propylene carbonate (PC), ethylene carbonate (EC), dimethyl carbonate (DMC), ethyl methyl carbonate (EMC), and diethyl carbonate (DEC) may be used.

As the nonaqueous solvent having an ether bond, for example, at least one selected from the group consisting of 1,2-dimethoxyethane, 1,2-dibutoxyethane, diglyme, triglyme, tetraglyme, tetrahydrofuran, 2-methyltetrahydrofuran, 2,5-dimethyltetrahydrofuran, 1,3-dioxolane, and 4-methyl-1,3-dioxolane may be used.

In addition, in the flow battery 1000 according to the embodiment 1, the first liquid 110 may be a liquid electrolyte which contains an electrolyte and which uses the above nonaqueous solvent as a solvent. The electrolyte (salt) described above may be at least one selected from the group consisting of $LiBF_4$, $LiPF_6$, LiTFSI, LiFSI, $LiCF_3SO_3$, and $LiClO_4$. In addition, the solvent described above may have a high dielectric constant, a low reactivity with lithium ions, and a potential window of approximately 4V.

In addition, in the flow battery 1000 according to the embodiment 1, as the first redox species 111, a material which is dissolved in the above nonaqueous solvent and which is electrochemically oxidized and reduced may be used. As the first redox species 111, for example, there may be used a metal ion, such as vanadium, iron, or chromium, or a metal complex ion, each of which is capable of having a plurality of valence states; a heterocyclic compound, such as a tetrathiafulvalene derivative, a bipyridyl derivative, a thiophene derivative, a thianthrene derivative, a carbazole derivative, or phenanthroline; an oxocarbonic acid; an aromatic ketone, such as benzophenone or acetophenone; an aromatic compound, such as biphenyl, phenanthrene, stilbene, triphenylene, or terphenyl; or a metallocene compound, such as ferrocene. In addition, if needed, at least two of those compounds may be used in combination.

In addition, in the flow battery 1000 according to the embodiment 1, the first electrode 210 may be used as a cathode, and the second electrode 220 may be used as an anode.

In addition, as the second electrode 220, if an electrode having a relatively high potential is used, the first electrode 210 may be used as the anode.

That is, the first electrode 210 may be used as the anode, and the second electrode 220 may be used as a cathode.

In addition, in the flow battery 1000 according to the embodiment 1, for example, since the first liquid 110 is brought into contact with the first electrode 210, the first redox species 111 is oxidized or reduced by the first electrode 210.

The first electrode 210 may be an electrode having a surface which can be used as a reaction field of the first redox species 111.

In this case, as the first electrode 210, a material stable to the first liquid 110 may be used. The material stable to the first liquid 110 may be, for example, a material insoluble in the first liquid 110. Furthermore, as the first electrode 210, a material stable to an electrochemical reaction, which is an electrode reaction, may be used. For example, as the first electrode 210, a metal, carbon, or the like may be used. As the metal, for example, stainless steel, iron, copper, or nickel may be used.

The first electrode 210 may have the structure in which the surface area is increased. As a material having the structure in which the surface area is increased, for example, a mesh, a nonwoven fabric, a surface roughening treated plate, or a sintered porous material may be used. By the material mentioned above, the specific surface area of the first electrode 210 is increased. Accordingly, an oxidation reaction or a reduction reaction of the first redox species 111 can be more easily performed.

The second electrode 220 may have the structure in which an active material is provided on a collector. By the structure described above, for example, an active material having a large capacity may be used. As the active material of the second electrode 220, a compound capable of reversibly occluding and releasing lithium ions may be used.

In addition, the second electrode 220 may be formed of a lithium metal. As the second electrode 220, when a lithium metal is used, the control of dissolution and precipitation can be easily performed as the metal cathode, and in addition, a large capacity can be realized.

<Explanation of Charge/Discharge Process>

A charge/discharge process of the flow battery 1000 according to the embodiment 1 will be described.

In addition, in particular, with reference to an operation example having the following structure, the charge/discharge process will be described.

In this operation example, the first electrode 210 is used as the cathode and is formed of carbon black.

In addition, in this operation example, the first liquid 110 is an ether solution in which the first redox species 111 is dissolved.

In addition, in this operation example, the first redox species 111 is benzophenone (hereinafter, referred to as "BP").

In addition, in this operation example, the second electrode 220 is used as the anode and is formed of a lithium metal.

[Explanation of Charge Process]

First, a charge reaction will be described.

When the voltage is applied between the first electrode 210 and the second electrode 220, the charge is performed.

(Reaction at Anode Side)

By the application of the voltage, electrons are supplied to the second electrode 220 used as the anode from the outside of the flow battery 1000. Accordingly, at the second electrode 220 used as the anode, a reduction reaction occurs. That is, the anode is placed in a charged state.

For example, in this operation example, the following reaction occurs.

$$Li^+ + e^- \rightarrow Li$$

(Reaction at Cathode Side)

By the application of the voltage, at the first electrode 210 used as the cathode, the oxidation reaction of the first redox species 111 occurs. That is, on the surface of the first electrode 210, the first redox species 111 is oxidized. Accordingly, electrons are released from the first electrode 210 to the outside of the flow battery 1000.

For example, in this operation example, the following reaction occurs.

$$BP \cdot Li \rightarrow BP + Li^+ + e^-$$

The charge reaction described above will be performed until the first redox species 111 is placed in a fully charged state or the second electrode 220 is placed in a fully charged state.

[Explanation of Discharge Process]

Next, a discharge reaction from the fully charged state will be described.

In the fully charged state, the first redox species 111 and the second electrode 220 are each placed in a charged state.

By the discharge reaction, an electrical power is extracted between the first electrode 210 and the second electrode 220.

(Reaction at Anode Side)

At the second electrode 220 used as the anode, an oxidation reaction occurs. That is, the anode is placed in a discharged state. Accordingly, electrons are released from the second electrode 220 to the outside of the flow battery 1000.

For example, in this operation example, the following reaction occurs.

(Reaction at Cathode Side)

By the discharge of the battery, electrons are supplied to the first electrode 210 used as the cathode from the outside of the flow battery 1000. Accordingly, on the first electrode 210, the reduction reaction of the first redox species 111 occurs. That is, on the surface of the first electrode 210, the first redox species 111 is reduced.

For example, in this operation example, the following reaction occurs.

In addition, some lithium ions ($Li^+$ ions) are supplied from a second electrode 220 side through the separator 400.

The discharge reaction described above is performed until the first redox species 111 is placed in a fully discharged state or the second electrode 220 is placed in a fully discharged state.

Embodiment 2

Hereinafter, an embodiment 2 will be described. In addition, explanations duplicated with those in the above embodiment 1 will be appropriately omitted.

Figure 2:
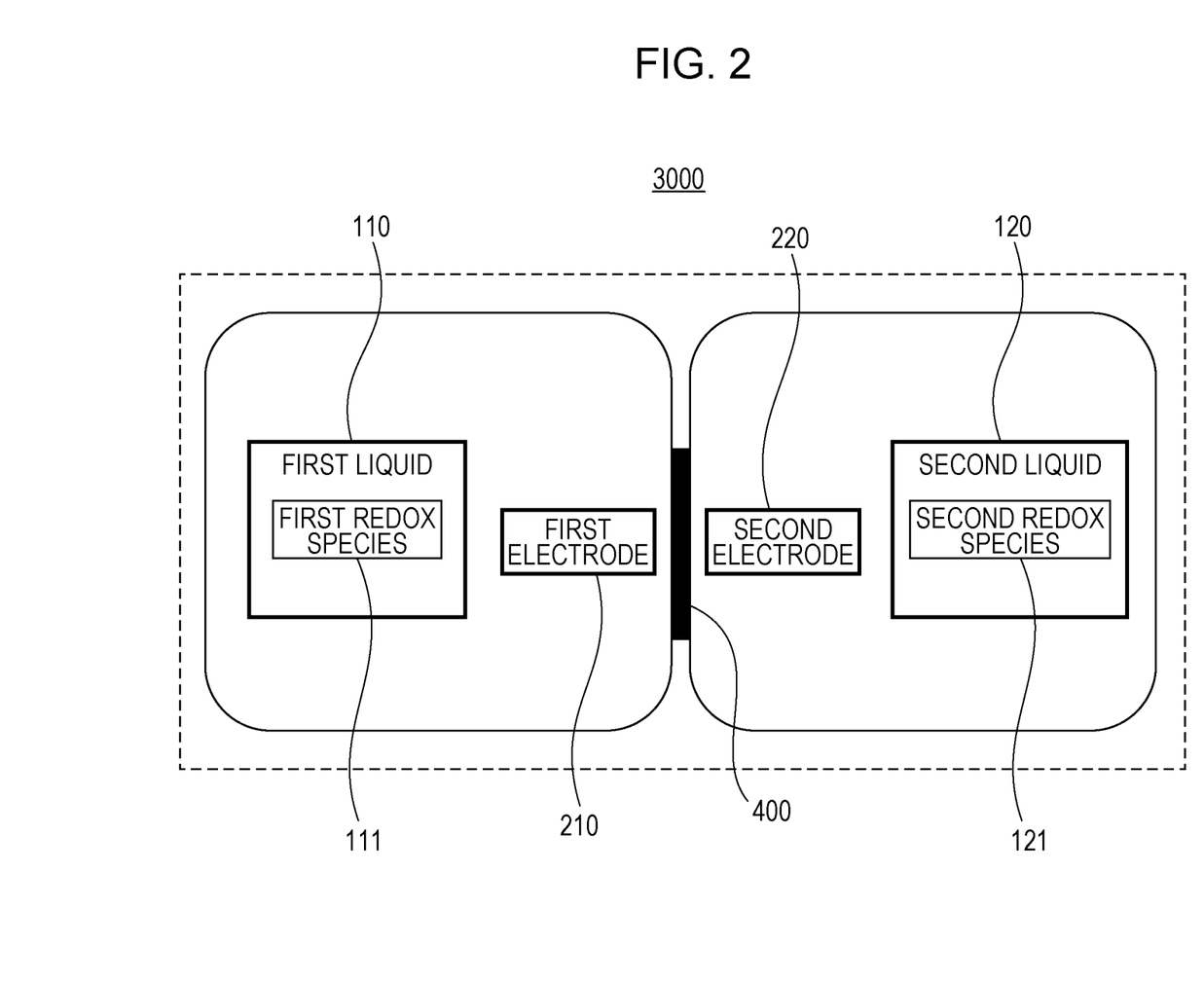
FIG. 2 is a block diagram showing a schematic structure of a flow battery according to an embodiment 2.

As the embodiment 2, the structure is shown in which a liquid electrolyte is circulated at both sides, that is, at the first electrode side and the second electrode side.

FIG. 2 is a block diagram showing a schematic structure of a flow battery 3000 of the embodiment 2 by way of example.

The flow battery 3000 according to the embodiment 2 includes the following structure besides the structure of the flow battery 1000 according to the above embodiment 1.

That is, the flow battery 3000 according to the embodiment 2 further includes, besides the structure of the flow battery 1000 according to the embodiment 1, a second liquid 120 and a second redox species 121.

The second liquid 120 is a liquid in which the second redox species 121 is dissolved.

In this embodiment, the second electrode 220 is immersed in the second liquid 120.

The separator 400 separates the first electrode 210 and the first liquid 110 from the second electrode 220 and the second liquid 120.

According to the structure described above, the flow battery 3000 can be formed to have a large charge capacity and to maintain the charge/discharge characteristics for a long time.

That is, since the separator 400 has the structure described above, the separator 400 is not swelled by the first liquid 110 and the second liquid 120, each of which is a liquid electrolyte in contact with the separator 400, and can also conduct metal ions. Accordingly, the range of choice of the first liquid 110 to be used, the first redox species 111, the second liquid 120, and the second redox species 121 is increased, a controllable range of the charging potential and the discharging potential is increased, and the charge capacity can be increased. Furthermore, even if the composition of the first liquid 110 is different from that of the second liquid 120, those two types of liquids are maintained by the separator 400 without being mixed together, and hence, the charge/discharge characteristics of the flow battery 3000 can be maintained for a long time.

In the flow battery 3000 according to the embodiment 2, as is the case of the first liquid 110, the second liquid 120 may use a nonaqueous solvent containing at least one of a carbonate group and an ether bond. The second liquid 120 may use the same nonaqueous solvent as that of the first liquid 110 or may use a different nonaqueous solvent from that thereof.

In the flow battery 3000 according to the embodiment 2, as the second redox species 121, a material which is dissolved in the nonaqueous solvent described above and is electrochemically oxidized and reduced may be used. In particular, for example, metal-containing ions or organic compounds similar to those for the first redox species 111 may be used. When a low potential compound is used for one of the first redox species 111 and the second redox species 121, and a high potential compound is used for the remaining redox species, the flow battery 3000 can be operated.

Embodiment 3

Hereinafter, an embodiment 3 will be described. In addition, explanations duplicated with those of the embodiment 1 or 2 will be appropriately omitted.

Figure 4:
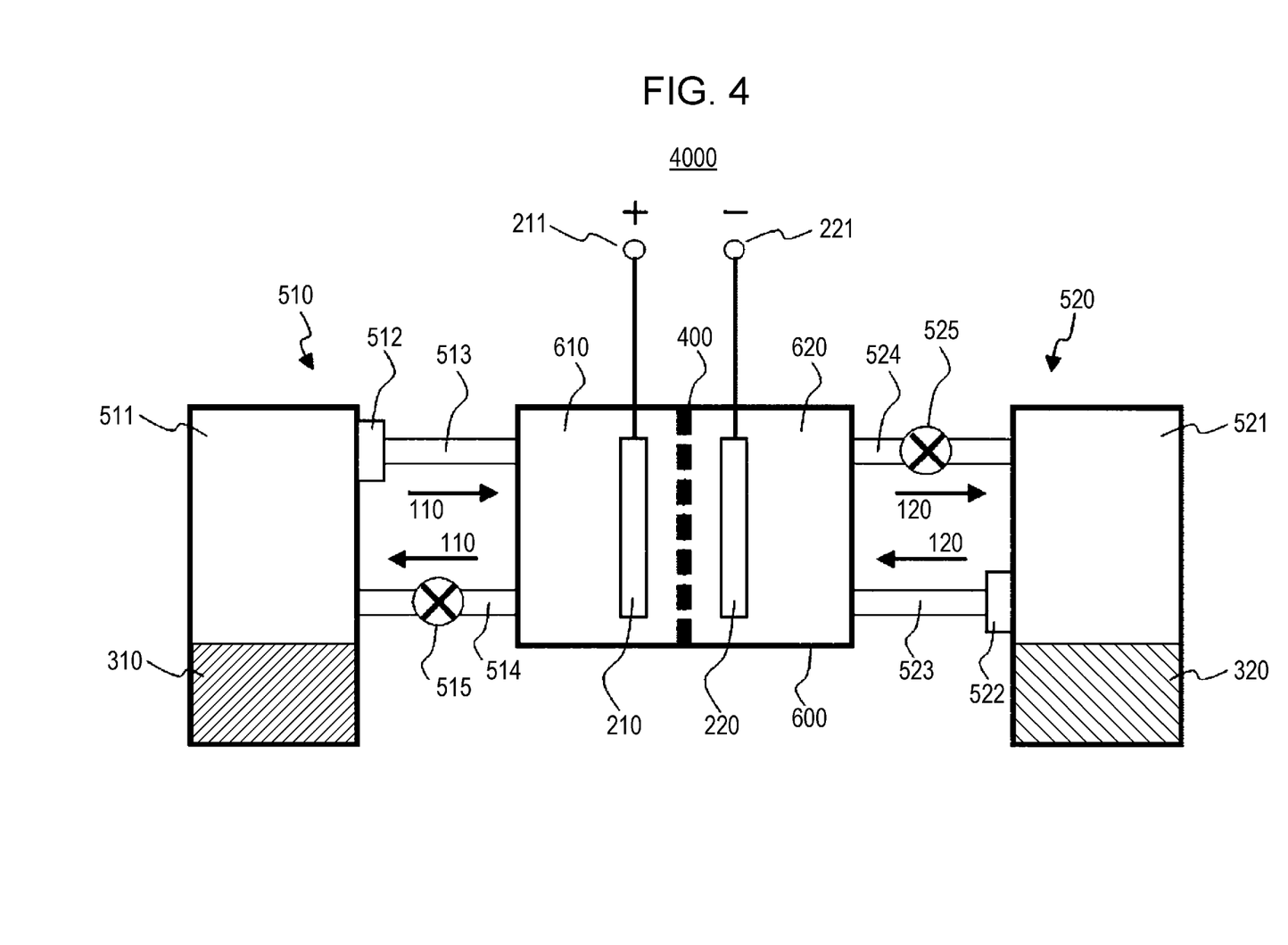
FIG. 4 is a schematic view showing a schematic structure of a flow battery according to an embodiment 3.

FIG. 4 is a schematic view showing the structure of a flow battery 4000 according to the embodiment 3 by way of example.

The flow battery 4000 according to the embodiment 3 has the following structure besides the structure of the flow battery 3000 according to the above embodiment 2.

That is, the flow battery 4000 according to the embodiment 3 includes a first circulation mechanism 510 besides the structure of the flow battery 3000 according to the embodiment 2.

The first circulation mechanism 510 is a mechanism circulating the first liquid between the first electrode and the first active material.

The first circulation mechanism 510 includes a first receiving portion 511.

The first active material 310 and the first liquid 110 are received in the first receiving portion 511.

The first circulation mechanism 510 circulates the first liquid 110 between the first electrode 210 and the first receiving portion 511.

Since the first active material 310 and the first liquid 110 are brought into contact with each other in the first receiving portion 511, at least one of the oxidation reaction and the reduction reaction of the first redox species 111, that is, of a first electrode mediator, by the first active material 310 is performed.

By the structure described above, in the first receiving portion 511, the first liquid 110 and the first active material 310 can be brought into contact with each other. Accordingly, for example, the contact area between the first liquid 110 and the first active material 310 can be more increased. In addition, the contact time between the first liquid 110 and the first active material 310 can be more increased. Hence, the oxidation reaction and the reduction reaction of the first redox species 111 by the first active material 310 can be more efficiently performed.

In addition, in the embodiment 3, the first receiving portion 511 may be, for example, a tank.

In addition, for example, the first receiving portion 511 may receive the first liquid 110 in which the first redox species 111, which is the first electrode mediator, is dissolved, for example, in spaces formed between particles of the first active material 310 thus filled.

In addition, as shown in FIG. 4, the flow battery 4000 according to the embodiment 3 may further include an electrochemical reaction portion 600, a cathode terminal 211, and an anode terminal 221.

The electrochemical reaction portion 600 is separated into a cathode chamber 610 and an anode chamber 620 by the separator 400.

In the cathode chamber 610, an electrode used as the cathode is disposed. In FIG. 4, in the cathode chamber 610, the first electrode 210 is disposed.

The cathode terminal 211 is connected to the first electrode 210 used as the cathode.

In the anode chamber 620, an electrode used as the anode is disposed. In FIG. 4, in the anode chamber 620, the second electrode 220 is disposed.

The anode terminal 221 is connected to the second electrode 220 used as the anode.

The cathode terminal 211 and the anode terminal 221 are connected, for example, to a charge/discharge device. By the charge/discharge device, the voltage is applied between the cathode terminal 211 and the anode terminal 221, or an electrical power is extracted between the cathode terminal 211 and the anode terminal 221.

In addition, as shown in FIG. 4, in the flow battery 4000 according to the embodiment 3, the first circulation mechanism 510 may include a pipe 514, a pipe 513, and a pump 515.

One end of the pipe 514 is connected to one of the cathode chamber 610 and the anode chamber 620 in which the first electrode 210 is disposed. In FIG. 4, the one end of the pipe 514 is connected to the cathode chamber 610.

The other end of the pipe 514 is connected to the first receiving portion 511 at an inlet of the first liquid 110.

One end of the pipe 513 is connected to the first receiving portion 511 at an outlet of the first liquid 110.

The other end of the pipe 513 is connected to one of the cathode chamber 610 and the anode chamber 620 in which the first electrode 210 is disposed. In FIG. 4, the other end of the pipe 513 is connected to the cathode chamber 610.

The pump 515 is provided, for example, at the pipe 514. Alternatively, the pump 515 may be provided at the pipe 513.

In addition, in the flow battery 4000 according to the embodiment 3, the first circulation mechanism 510 may also include a first permeation suppression portion 512.

The first permeation suppression portion 512 suppresses the permeation of the first active material 310.

The first permeation suppression portion 512 is provided at a flow path through which the first liquid 110 flows from the first receiving portion 511 to the first electrode 210. In FIG. 4, the first permeation suppression portion 512 is provided at the pipe 513.

According to the structure described above, the first active material 310 is suppressed from flowing to a side (for example, to a first electrode 210 side) other than the first receiving portion 511. That is, the first active material 310 stays in the first receiving portion 511. Accordingly, a flow battery in which the first active material 310 itself is not circulated can be realized. Hence, clogging of members of the first circulation mechanism 510 caused by the first active material 310 can be prevented. The members of the first circulation mechanism 510 may be, for example, the pipes. In addition, the generation of resistance loss caused by the flow of the first active material 310 to the first electrode 210 side can also be prevented.

The first permeation suppression portion 512 may be provided, for example, at a joint portion between the first receiving portion 511 and the pipe 513.

The first permeation suppression portion 512 may be, for example, a filter filtrating the first active material 310. In this case, the filter may be a member having pores smaller than the minimum particle diameter of the particles of the first active material 310. As a material of the filter, a material which is not allowed to react with the first active material 310, the first liquid 110, and the like may be used. As the filter, for example, there may be mentioned glass fiber filter paper, a polypropylene nonwoven fabric, a polyethylene nonwoven fabric, a polyethylene separator, a polypropylene separator, a polyimide separator, a separator having a two-layer structure of PE/PP, a separator having a three-layer structure of PP/PE/PP, or a metal mesh which is not allowed to react with lithium metal.

According to the structure described above, in the first receiving portion 511, even if the flow of the first active material 310 is generated in association with the flow of the first liquid 110, the first active material 310 is prevented from flowing out of the first receiving portion 511.

In FIG. 4, the first liquid 110 received in the first receiving portion 511 is supplied to the cathode chamber 610 through the first permeation suppression portion 512 and the pipe 513.

Accordingly, the first redox species 111 contained in the first liquid 110 is oxidized or reduced by the first electrode 210.

Subsequently, the first liquid 110 in which the oxidized or the reduced first redox species 111 is dissolved is supplied to the first receiving portion 511 through the pipe 514 and the pump 515.

Hence, at least one of the oxidation reaction and the reduction reaction is performed on the first redox species 111 contained in the first liquid 110 by the first active material 310.

In addition, the control of the circulation of the first liquid 110 may be performed, for example, by the pump 515. That is, by the pump 515, the start of the supply of the first liquid 110, the stop of the supply thereof, the supply amount of the first liquid 110, or the like may be appropriately performed.

In addition, the control of the circulation of the first liquid 110 may be performed by a method other than that using the pump 515. The other method may be, for example, a method using a valve or the like.

In addition, in FIG. 4, as one example, the first electrode 210 is used as the cathode, and the second electrode 220 is used as the anode.

In this case, as the second electrode 220, when an electrode having a relatively higher potential is used, the first electrode 210 may be used as the anode.

That is, the first electrode 210 may be used as the anode, and the second electrode 220 may be used as the cathode.

In addition, at a cathode chamber 610 side and at a anode chamber side 620 separated by the separator 400, the compositions of the liquid electrolytes and/or the compositions of the solvents may be different from each other.

In addition, the composition of the liquid electrolyte and/or the composition of the solvent at the cathode chamber 610 side may be the same as those at the anode chamber 620 side.

The flow battery 4000 according to the embodiment 3 may further include a second circulation mechanism 520.

The second circulation mechanism 520 is a mechanism circulating the second liquid 120 between the second electrode 220 and a second active material 320.

The second circulation mechanism 520 includes a second receiving portion 521.

The second active material 320 and the second liquid 120 are received in the second receiving portion 521.

The second circulation mechanism 520 circulates the second liquid 120 between the second electrode 220 and the second receiving portion 521.

Since the second active material 320 and the second liquid 120 are brought into contact with each other in the second receiving portion 521, at least one of an oxidation reaction and a reduction reaction of the second redox species 121, that is, of a second electrode mediator, is performed by the second active material 320.

According to the structure described above, in the second receiving portion 521, the second liquid 120 and the second active material 320 can be brought into contact with each other. As a result, for example, the contact area between the second liquid 120 and the second active material 320 can be more increased. In addition, the contact time between the second liquid 120 and the second active material 320 can be more increased. Hence, at least one of the oxidation reaction and the reduction reaction of the second redox species 121 by the second active material 320 can be more efficiently performed.

In addition, in the embodiment 3, the second receiving portion 521 may be, for example, a tank.

In addition, the second receiving portion 521 may receive the second liquid 120 in which the second redox species 121 is dissolved, for example, in spaces formed between particles of the second active material 320 thus filled.

In addition, as shown in FIG. 4, in the flow battery 4000 according to the embodiment 3, the second circulation mechanism 520 may include a pipe 523, a pipe 524, and a pump 525.

One end of the pipe 524 is connected to one of the cathode chamber 610 and the anode chamber 620 in which the second electrode 220 is disposed. In FIG. 4, the one end of the pipe 524 is connected to the anode chamber 620.

The other end of the pipe 524 is connected to the second receiving portion 521 at an inlet of the second liquid 120.

One end of the pipe 523 is connected to the second receiving portion 521 at an outlet of the second liquid 120.

The other end of the pipe 523 is connected to one of the cathode chamber 610 and the anode chamber 620 in which the second electrode 220 is disposed. In FIG. 4, the other end of the pipe 523 is connected to the anode chamber 620.

The pump 525 is provided, for example, at the pipe 524. Alternatively, the pump 525 may be provided at the pipe 523.

In addition, in the flow battery 4000 according to the embodiment 3, the second circulation mechanism 520 may also include a second permeation suppression portion 522.

The second permeation suppression portion 522 suppresses the permeation of the second active material 320.

The second permeation suppression portion 522 is provided at a flow path through which the second liquid 120 flows from the second receiving portion 521 to the second electrode 220. In FIG. 4, the second permeation suppression portion 522 is provided at the pipe 523.

According to the structure described above, the second active material 320 is suppressed from flowing to a side (for example, to a second electrode 220 side) other than the second receiving portion 521. That is, the second active material 320 stays in the second receiving portion 521. Accordingly, a flow battery in which the second active material 320 itself is not circulated can be realized. Hence, clogging of members of the second circulation mechanism 520 caused by the second active material 320 can be prevented. The members of the second circulation mechanism 520 may be, for example, the pipes. In addition, the generation of resistance loss caused by the flow of the second active material 320 to the second electrode 220 side can also be prevented.

The second permeation suppression portion 522 may be provided, for example, at a joint portion between the second receiving portion 521 and the pipe 523.

The second permeation suppression portion 522 may be, for example, a filter filtrating the second active material 320. In this case, the filter may be a member having pores smaller than the minimum particle diameter of the particles of the second active material 320. As a material of the filter, a material which is not allowed to react with the second active material 320, the second liquid 120, and the like may be used. As the filter, for example, there may be mentioned glass fiber filter paper, a polypropylene nonwoven fabric, a polyethylene nonwoven fabric, or a metal mesh which is not allowed to react with lithium metal.

According to the structure described above, in the second receiving portion 521, even if the flow of the second active material 320 is generated in association with the flow of the second liquid 120, the second active material 320 is prevented from flowing out of the second receiving portion 521.

In the example shown in FIG. 4, the second liquid 120 received in the second receiving portion 521 is supplied to the anode chamber 620 through the second permeation suppression portion 522 and the pipe 523.

Accordingly, the second redox species 121 contained in the second liquid 120 is oxidized or reduced by the second electrode 220.

Subsequently, the second liquid 120 in which the oxidized or the reduced second redox species 121 is dissolved is supplied to the second receiving portion 521 through the pipe 524 and the pump 525.

Hence, at least one of the oxidation reaction and the reduction reaction is performed by the second active material 320 on the second redox species 121 contained in the second liquid 120.

In addition, the control of the circulation of the second liquid 120 may be performed, for example, by the pump 525. That is, by the pump 525, the start of the supply of the second liquid 120, the stop of the supply thereof, the supply amount of the second liquid 120, or the like may be appropriately performed.

In addition, the control of the circulation of the second liquid 120 may be performed by a method other than that using the pump 525. The other method may be, for example, a method using a valve or the like.

In addition, in FIG. 4, as one example, the first electrode 210 is used as the cathode, and the second electrode 220 is used as the anode.

In this case, as the first electrode 210 side, when an electrode structure having a relatively low potential is used, the second electrode 220 side may be used as the cathode.

That is, the second electrode 220 may be used as the cathode, and the first electrode 210 may be used as the anode.

In addition, the structures according to the above embodiments 1 to 3 may be appropriately used in combination.

EXAMPLES

Example 1-1

After 0.287 g of LiTFSI (manufactured by Kishida Chemical Co., Ltd.) and 0.05 g of a photopolymerization initiator (Irgacure 184, manufactured by BASF Japan Ltd.)

were added to 1 mL of polytetramethylene glycol diacrylate (NK ester A-PTMG-65, manufactured by Shin-Nakamura Chemical Co., Ltd.), the mixture thus obtained was heated to 60° C. and stirred, so that a uniform raw material liquid was obtained. This raw material liquid was applied to a glass plate and was then irradiated with UV rays (wavelength: 365 nm) at 120 mW/cm² and 2,500 mJ/cm² to perform a radical polymerization reaction, so that a pale yellow transparent polymer film (film thickness: 75 μm) was obtained. The structure of the polymer thus synthesized in this example is shown by the following formula (1). In addition, the content of the tetramethylene oxide units forming the poly(alkylene oxide) was 100 mole percent.

(1)

Example 1-2

Except for that the weight of LiTFSI was changed to 0.861 g, a film was formed in a manner similar to that of Example 1-1. The content of the tetramethylene oxide units forming the poly(alkylene oxide) was 100 mole percent.

Example 1-3

Except for that the weight of LiTFSI was changed to 1.435 g, a film was formed in a manner similar to that of Example 1-1. The content of the tetramethylene oxide units forming the poly(alkylene oxide) was 100 mole percent.

Figure 3:
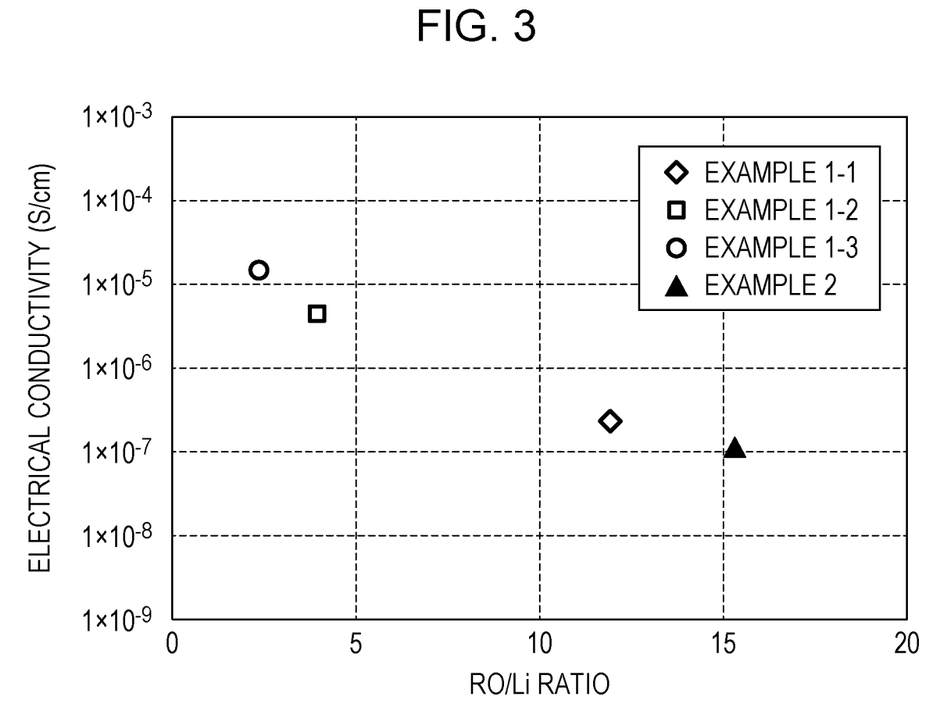
FIG. 3 is a graph showing the electrical conductivity of a polymer film to be used for a separator of each of Examples 1-1, 1-2, 1-3, and 2.

The electrical conductivity at 25° C. of the film of each of Examples 1-1, 1-2, and 1-3 was measured. The measurement results are shown in FIG. 3. In FIG. 3, an RO/Li ratio represents the molar ratio of the alkylene oxide units to lithium. As the content of LiTFSI was increased, the electrical conductivity was improved.

In addition, when being brought into contact with propylene carbonate and 1,2-dibutoxyethane, the films of Examples 1-1, 1-2, and 1-3 were each not swelled, and the shapes thereof were maintained.

Example 2

First, 0.75 ml of tetrahydrofuran (manufactured by Kishida Chemical Co., Ltd.), 0.34 mL of ethylene glycol diglycidyl ether (Epolite 40E, manufactured by Kyoeisha Chemical Co., Ltd.), and 0.29 g of LiTFSI were mixed together at room temperature to form a uniform solution. After this solution was cooled to 0° C., and 17 μL of a boron trifluoride diethyl ether complex (manufactured by Tokyo Chemical Industry Co., Ltd.) was added dropwise while the solution was stirred, a raw material liquid thus obtained was applied on a Teflon sheet, and another Teflon sheet was pressed over the raw material liquid thus applied and was then left at room temperature for 20 minutes. A film obtained by performing a cationic ring-opening polymerization was heated for 16 hours in an oven at 80° C., so that a colorless transparent polymer film (film thickness: 75 μm) was obtained. By ¹H-NMR and ¹³C-NMR using a FT NMR apparatus (trade name: JNM-ECZ600R, manufactured by JEOL Ltd.), the structure of the polymer was analyzed from the polymer film thus obtained. The structure of the polymer synthesized in this example is shown by the following formula (2). In addition, the content of tetramethylene oxide units forming the poly(alkylene oxide) was 60 mole percent.

(2)

(In the formula, R represents —CH₂OCH₂CH₂OCH₂—.)

The electrical conductivity of this film was $1\times10^{-7}$ S/cm at 25° C. and $1\times10^{-5}$ S/cm at 85° C.

Example 3

A raw material liquid prepared by a method similar to that of Example 2 was impregnated in a PP nonwoven fabric and was then left at room temperature until being solidified. Subsequently, heating was performed for 3 hours in an oven at 80° C., so that a polymer-impregnated film was obtained. When this impregnated film was provided as a separator in a glass-made cell, and 2-methyltetrahydrofuran was charged into one side of the cell, the shape of the impregnated film was maintained, and the intrusion of the solvent into a side opposite to the side described above was not observed.

Comparative Example 1

After 0.29 g of LiTFSI and 0.05 g of the photopolymerization initiator of Example 1-1 were added to 1 g of a polyethylene oxide-based acrylate monomer (Elexcel TA-210, manufactured by DKS Co., Ltd.), stirring was performed at room temperature, so that a uniform raw material liquid was obtained. This raw material liquid was impregnated in a PP nonwoven fabric and was then irradiated with UV rays (wavelength: 365 nm) at 120 mW/cm² and 2,500 mJ/cm², so that a polymer-impregnated film was obtained. Although the electrical conductivity was $1\times10^{-4}$ S/cm, when this impregnated film was provided as a separator in a glass-made cell, and 1,2-dimethoxyethane was charged into one side of the cell, the polymer in the impregnated film was swelled, and the intrusion of the solvent into a side opposite to the side described above was observed.

Comparative Example 2

After 1 mL of the ethylene glycol diglycidyl ether described in Example 2 was cooled to 0° C., 0.29 g of LiTFSI and 0.04 g of lanthanum trifluoromethanesulfonate (manufactured by Tokyo Chemical Industry Co., Ltd.) were charged thereto. Subsequently, stirring was performed at room temperature for 10 minutes and at 60° C. for 25 minutes, so that a uniform raw material liquid was obtained. After this raw material liquid was applied on a Teflon sheet, another Teflon sheet was pressed over the above raw material liquid and was then heated at 80° C. for 44 hours, so that a colorless semitransparent film having a thickness of 100 μm was obtained. Although this film maintained its shape after being immersed in 2-methyltetrahydrofuran, the electrical conductivity of the film was less than $1\times10^{-9}$ S/cm, and the electrical conductive property was not obtained.

What is claimed is:

1. A flow battery comprising:
    a first liquid containing a first nonaqueous solvent;
    a first electrode immersed in the first liquid;
    a second electrode which is a counter electrode to the first electrode; and
    a separator separating the first electrode from the second electrode, wherein:
    the separator comprises a solid electrolyte containing:
        a metal compound; and
        a nonionic polymer which includes a poly(alkylene oxide) and cross-linking points, and
    at least one of alkylene oxide units forming the poly(alkylene oxide) is composed of a tetramethylene oxide unit.

2. The flow battery according to claim 1,
    wherein a content of the tetramethylene oxide unit in the alkylene oxide units is 25 mole percent or more.

3. The flow battery according to claim 1,
    wherein 50 mole percent or less of the alkylene oxide units are composed of an ethylene oxide unit.

4. The flow battery according to claim 1,
    wherein the metal compound is a lithium compound.

5. The flow battery according to claim 4,
    wherein with respect to oxygen atoms derived from the alkylene oxide units, a content of lithium derived from the lithium compound is 3 to 50 mole percent.

6. The flow battery according to claim 4,
    wherein the metal compound is at least one selected from the group consisting of $LiBF_4$, $LiPF_6$, $Li(FSO_2)_2N$, $Li(CF_3SO_2)_2N$, $LiCF_3SO_3$, and $LiClO_4$.

7. The flow battery according to claim 1,
    wherein the first nonaqueous solvent includes at least one selected from the group consisting of a solvent having a carbonate group and a solvent having an ether bond.

8. The flow battery according to claim 1,
    wherein the first nonaqueous solvent includes at least one selected from the group consisting of propylene carbonate, ethylene carbonate, dimethyl carbonate, ethyl methyl carbonate, and diethyl carbonate.

9. The flow battery according to claim 1,
    wherein the first nonaqueous solvent includes at least one selected from the group consisting of 1,2-dimethoxyethane, 1,2-dibutoxyethane, diglyme, triglyme, tetraglyme, tetrahydrofuran, 2-methyltetrahydrofuran, 2,5-dimethyltetrahydrofuran, 1,3-dioxolane, and 4-methyl-1,3-dioxolane.

10. The flow battery according to claim 1,
    wherein the nonionic polymer further includes 50 mole percent or less of a carboxy group with respect to the alkylene oxide units.

11. The flow battery according to claim 1,
    wherein the solid electrolyte further contains an acid residue.

12. The flow battery according to claim 1, further comprising:
    a first redox species in the first liquid;
    a first active material; and
    a first circulation mechanism circulating the first liquid between the first electrode and the first active material, wherein:
    the first nonaqueous solvent dissolves the first redox species,
    the first active material is insoluble in the first liquid,
    the first redox species is oxidized or reduced at the first electrode, and
    the first redox species is reduced or oxidized by the first active material.

13. The flow battery according to claim 1, further comprising:
    a second liquid containing a second nonaqueous solvent,
    wherein the second electrode is immersed in the second liquid.

14. The flow battery according to claim 13,
    wherein a composition of the second nonaqueous solvent is different from a composition of the first nonaqueous solvent.

15. The flow battery according to claim 13, further comprising:
    a second redox species;
    a second active material; and
    a second circulation mechanism circulating the second liquid between the second electrode and the second active material, wherein:
    the second nonaqueous solvent dissolves the second redox species,
    the second active material is insoluble in the second liquid,
    the second redox species is oxidized or reduced at the second electrode, and
    the second redox species is reduced or oxidized by the second active material.

16. A separator for a flow battery comprising:
    a solid electrolyte which contains:
        a metal compound; and
        a nonionic polymer including a poly(alkylene oxide) and cross-linking points,
    wherein at least one of alkylene oxide units forming the poly(alkylene oxide) is composed of a tetramethylene oxide unit.

17. The separator according to claim 16, further comprising a substrate supporting the solid electrolyte.

* * * * *